United States Patent [19]

Buecheler

[11] 4,315,857
[45] Feb. 16, 1982

[54] PROCESS FOR THE SYNTHESIS OF AZOBENZENE COMPOUNDS HAVING A CYANO GROUP IN ONE OR BOTH OF THE ORTHO POSITIONS OF THE DIAZO COMPONENT RADICAL

[75] Inventor: Paul Buecheler, Reinach, Switzerland

[73] Assignee: Sandoz Ltd., Basel, Switzerland

[21] Appl. No.: 168,614

[22] Filed: Jul. 14, 1980

[30] Foreign Application Priority Data

Jul. 20, 1979 [CH] Switzerland ..................... 6776/79

[51] Int. Cl.³ ..................... C09B 43/00; C09B 43/40
[52] U.S. Cl. ..................... 260/207.1; 260/155; 260/156; 260/205; 260/206; 260/207; 260/207.5; 260/208
[58] Field of Search ............... 260/208, 205, 206, 207, 260/207.1, 207.5, 156, 155

[56] References Cited

U.S. PATENT DOCUMENTS

| | | | |
|---|---|---|---|
| 3,821,195 | 6/1974 | Putzig | 260/206 |
| 3,876,621 | 4/1975 | Hagen et al. | 260/157 |
| 3,968,099 | 7/1976 | Leverenz | 260/208 |
| 3,978,040 | 8/1976 | Gottschlich et al. | 260/205 |
| 4,045,430 | 8/1977 | Hamprecht | 260/208 |
| 4,083,844 | 4/1978 | Gottschlich et al. | 260/174 |
| 4,126,610 | 11/1978 | Belfort | 260/205 |

FOREIGN PATENT DOCUMENTS

2846438 5/1980 Fed. Rep. of Germany ...... 260/208
1125683 8/1968 United Kingdom .

OTHER PUBLICATIONS

Stedman et al., Chemical Abstracts, vol. 70, #111275h (1969).
Wilson et al., J. Am. Chem. Soc. 82, 4515–4517 (1960).
Wilson et al., J. Am. Chem. Soc. 83, 286–289 (1961).

*Primary Examiner*—Floyd D. Higel
*Attorney, Agent, or Firm*—Gerald D. Sharkin; Richard E. Vila; Melvyn M. Kassenoff

[57] ABSTRACT

A process for the synthesis of an azobenzene compound having a cyano group in one or both of the ortho positions of the diazo component radical comprising reacting the corresponding azobenzene compound having a chloro, bromo or iodo substituent in one or both of the ortho positions of the diazo component radical with a copper thiocyanate or copper thiocyanate-forming mixture of salts in the presence of an oxidizing agent (e.g., oxygen and sodium perborate), whereby the or at least one of the chloro, bromo and iodo substituents is replaced by a cyano group.

19 Claims, No Drawings

PROCESS FOR THE SYNTHESIS OF AZOBENZENE COMPOUNDS HAVING A CYANO GROUP IN ONE OR BOTH OF THE ORTHO POSITIONS OF THE DIAZO COMPONENT RADICAL

The present invention relates to a process for the preparation of azobenzene compounds.

More particularly the present invention provides a process for the preparation of azobenzene compounds having a cyano group on the diazo component radical ortho to the azo group comprising reacting the corresponding halo-substituted compound with a copper thiocyanate in the presence of an oxidizing agent whereby the halo atom is exchanged for a cyano group. As used herein, halo means chloro, bromo or iodo.

The preferred thiocyanates are Cu(I) thiocyanate or Cu(I) thiocyanate-forming mixtures of salts. A mixture of such salts may be employed. Suitable salts for such mixtures are alkali- and ammonium thiocyanate, copper sulphate and copper acetate.

The substitution reaction is preferably carried out in aprotic solvent for example dimethylformamide, dimethylsulphoxide, dimethylsulphone, methylpyrrolidone and pyridine. The solvent may contain small amounts of water. A preferred solvent consists of 9 parts pyridine and 1 part water. The reaction temperature may be from 0° C. to about 100° C., preferably between 25° and 60° C.

In general an excess of the copper thiocyanate compound is employed, for example two moles thiocyanate compound per mole of halogen to be substituted. However, where the starting material contains halogen atoms in both positions ortho to the azo group and it is desired to replace only one by a cyano group, the thiocyanate compound should be employed only in very slight excess of the stoichiometric amount.

The oxidizing agent may be any of the commonly used oxidizing agents, for example atmospheric oxygen. However, the preferred oxidizing agent is sodium perborate. Suitably, when sodium perborate is employed, 2 to 3 moles of sodium perborate (added as $NaBO_2 \cdot H_2O_2 \cdot 3H_2O$) per mole of azobenzene compound is used.

The azobenzene compound to be reacted with the metal thiocyanate is preferably one in which the diazo component radical has an electron-withdrawing substituent. Examples of such electron-withdrawing substituents are nitro, alkylsulphonyl, cyano, aminosulphonyl, aminocarbonyl, mono- or di-alkylaminosulphonyl, alkylaminocarbonyl, dialkylaminocarbonyl, N-phenyl-N-alkylaminocarbonyl and N-phenyl-N-alkylaminosulphonyl, said alkyl groups in such electron-withdrawing substituents being lower alkyl, preferably containing 1 to 4 (more preferably 1 or 2) carbon atoms. Preferably the electron-withdrawing substituent is meta to the halogen to be replaced.

The preferred azobenzene dyes for the substitution reaction are those which have a coupling component radical of the aniline series.

More preferred azobenzene dyes for the substitution reaction are those of formula I,

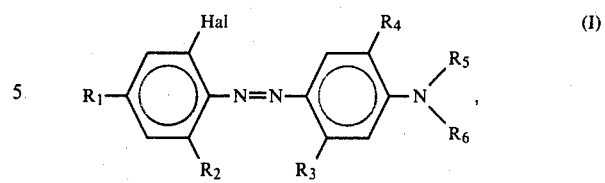

in which
Hal is bromine or iodine, preferably bromine,
$R_1$ is nitro, cyano, methylsulphonyl, aminosulphonyl or $C_{1-2}$alkyl- or di($C_{1-2}$alkyl)-aminosulphonyl,
$R_2$ is hydrogen, chlorine, bromine, iodine, nitro, cyano or methylsulphonyl,
$R_3$ is hydrogen, chlorine, bromine, methyl, $C_{1-2}$alkoxy, $C_{1-2}$alkylsulphonylamino, ($C_{1-2}$alkoxy)carbonylamino, 2-($C_{1-4}$alkoxy)ethoxycarbonylamino, or ($C_{1-2}$alkyl)carbonylamino in which the alkyl is optionally monosubstituted by chlorine, bromine, hydroxy, $C_{1-4}$alkoxy, cyano, phenyl or phenoxy,
either
$R_4$ is hydrogen, $C_{1-2}$alkyl or $C_{1-2}$alkoxy,
$R_5$ is allyl, chloro-, bromo- or iodoallyl, cyclohexyl or $C_{2-4}$alkyl optionally monosubstituted in the 2-, 3- or 4-position by hydroxyl, $C_{1-2}$alkoxy, $C_{1-2}$alkoxyethoxy, allyloxy, propynyloxy, ($C_{1-3}$alkyl)carbonyloxy, ($C_{1-3}$alkoxy)carbonyloxy or phenoxy, or $C_{1-4}$alkyl optionally monosubstituted by halogen, cyano, ($C_{1-2}$alkoxy) carbonyl or phenyl, and
$R_6$ is hydrogen or is one of the significances given for $R_5$,
or $R_4$, $R_5$ and $R_6$ together with the nitrogen atom and the ring carbon atoms form a group of formula (a)

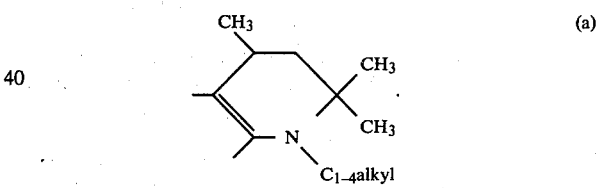

Even more preferred compounds are those wherein $R_4$, $R_5$ and $R_6$ are other than the group (a). Most preferred compounds of formula I are those in which $R_1$ is nitro, $R_2$ is hydrogen, chlorine, bromine, nitro, cyano or methylsulphonyl, $R_3$ is ($C_{1-2}$alkyl)carbonylamino, ($C_{1-2}$alkoxy)carbonylamino or $C_{1-2}$alkyl (preferably methyl)-sulphonylamino, $R_4$ is hydrogen or $C_{1-2}$alkoxy, $R_5$ is $C_{2-4}$alkyl, cyclohexyl or $C_{2-3}$alkyl monosubstituted in the 2- or 3-position by ($C_{1-2}$-alkyl)carbonyloxy, cyano, hydroxy or phenyl, and $R_6$ is hydrogen or has one of the significances of $R_5$.

The process of the present invention, in contrast to that described in German Pat. No. 1,544,563, has the advantage that the highly poisonous cyano salts are avoided and the reaction may be carried out under relatively mild conditions at temperatures between 0° and 100° C., preferably 25° to 60° C.

The starting materials of formula I are either known or may be prepared in accordance with known methods from available starting materials. Similarly, the end products are in general known and those obtained from compounds of formula I are useful as disperse dyestuffs.

The following Examples further serve to illustrate the invention. In the Examples all parts are by weight and the temperatures are in degrees Centigrade.

Further compounds which may be reacted with copper (I) thiocyanate in accordance with the procedure of Example 1 are given in the following Table.

TABLE

| Ex. No. | $R_1$ | $R_2$ | Hal | $R_3$ | $R_4$ | $R_6$ | $R_5$ |
|---|---|---|---|---|---|---|---|
| 2 | —$NO_2$ | Br | Br | —$NHCOCH_3$ | H | —$C_2H_5$ | —$C_2H_5$ |
| 3 | " | H | Br | —$NHCOCH_2CH_2Cl$ | H | " | " |
| 4 | " | H | Br | —$NHCOC_2H_5$ | H | " | " |
| 5 | " | Br* | Br | " | H | " | " |
| 6 | " | Br | Br | —$NHCOCH_3$ | H | -n-$C_3H_7$ | -n-$C_3H_7$ |
| 7 | " | Br | Br | " | H | —$C_2H_5$ | —$CH_2CH_2OCH_2CH_2OC_2H_5$ |
| 8 | " | —$NO_2$ | Cl | " | H | " | —$CH_2C_6H_5$ |
| 9 | " | " | Br | " | —$OCH_3$ | H | Cyclohexyl |
| 10 | " | Br | Br | —$NHCOC_2H_5$ | H | -n-$C_4H_9$ | —$CH_2CH_2OCOCH_3$ |
| 11 | " | Br | Br | —OH | H | —$C_2H_5$ | —$C_2H_5$ |
| 12 | " | —$NO_2$ | Br | —$NHSO_2CH_3$ | H | " | " |
| 13 | —$SO_2CH_3$ | Br | Br | —$OC_2H_5$ | H | " | " |
| 14 | —$SO_2NH_2$ | Br | Br | —$NHCOCH_3$ | H | " | " |
| 15 | —$NO_2$ | —CN | Br | —$NHCOC_2H_5$ | H | " | " |
| 16 | " | Cl | Br | —$NHCOCH_3$ | H | " | " |
| 17 | " | I | Br | " | H | " | " |
| 18 | " | —$NO_2$ | Br | " | H | " | " |
| 19 | " | " | Br | —$CH_3$ | H | " | " |
| 20 | " | " | Br | —$NHCOCH_3$ | —$OC_2H_5$ | —$CH_2CH_2OCOCH_3$ | —$CH_2CH_2OCOCH_3$ |
| 21 | " | H | Br | H | H | —$CH_2CH_2OH$ | —$CH_2CH_2CN$ |
| 22 | " | —CN | Br | —$NHCOCH_3$ | H | —$CH_2H_5$ | —$C_2H_5$ |
| 23 | | | | | | | |

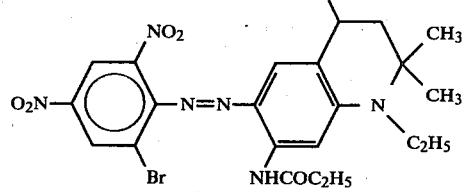

*only one bromine atom exchanged

EXAMPLE 1

12 Parts of the azo dyestuff from diazotized 2-bromo-4,6-dinitroaniline coupled with 1-N,N-diethylamino-3-acetylaminobenzene are stirred in 63 parts pyridine and 7 parts water and 8 parts copper (I) thiocyanate and 4 parts sodium perborate are added thereto. The reaction mixture is stirred for 2 hours at 50° and then 4 further parts of sodium perborate are added thereto. After a further 2 hours stirring at 50° the violet starting material-dyestuff has disappeared. The reaction mixture is stirred into 500 parts water and the precipitate obtained is suction filtered, washed with water and dried. The dried raw material is then dissolved in 800 parts acetone. The solution is filtered and the residue is washed with 400 parts acetone. The filtrate and wash-filtrate is added to 2000 parts water and the precipitate obtained is filtered, washed with water and dried.

7.2 Parts of dyestuff of formula

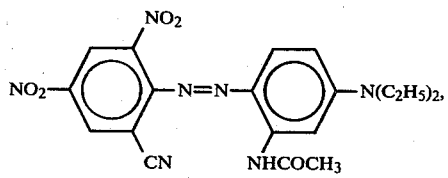

which dyes polyester fibres in blue shades having good fastnesses, is obtained. The IR spectrum of the product shows a clear CN-band and no SCN-band. The mass-spectrographically obtained molecular weight is 425.

What is claimed is:

1. A process for the synthesis of an azobenzene compound having a cyano group in one or both of the positions of the diazo component radical that are ortho to the azo radical comprising reacting the corresponding azobenzene compound having a chloro, bromo or iodo substituent in one or both of the positions of the diazo component radical that are ortho to the azo radical with a copper thiocyanate or copper thiocyanate-forming mixture of salts in the presence of an oxidizing agent, whereby the ortho chloro, bromo or iodo substituent or, if two ortho chloro, bromo or iodo substituents are present, at least one of them is replaced by a cyano group.

2. A process according to claim 1 wherein the copper thiocyanate or copper thiocyanate-forming mixture of salts is cuprous thiocyanate or a cuprous thiocyanate-forming mixture of salts.

3. A process according to claim 1 wherein the reaction is carried out at a temperature of 0° C. to about 100° C.

4. A process according to claim 3 wherein the reaction is carried out at a temperature of 25° C. to 60° C.

5. A process according to claim 1 wherein the reaction is carried out in an aprotic solvent or a mixture of an aprotic solvent and a small amount of water.

6. A process according to claim 5 wherein the aprotic solvent is dimethylformamide, dimethyl sulfoxide, dimethyl sulfone, methylpyrrolidone or pyridine.

7. A process according to claim 6 wherein the reaction solvent consists of 9 parts pyridine and 1 part water.

8. A process according to claim 1 wherein the oxidizing agent is sodium perborate.

9. A process according to claim 1 wherein the azobenzene compound having a chloro, bromo or iodo substituent in one or both of the ortho positions of its diazo component radical also contains an electron withdrawing group on its diazo component radical.

10. A process according to claim 9 wherein the azobenzene compound has a coupling component radical of the aniline series.

11. A process according to claim 10 wherein the azobenzene compound is a compound of the formula

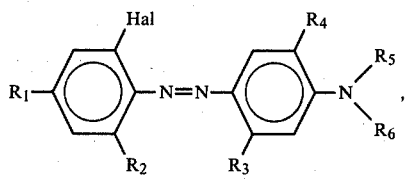

wherein
Hal is bromo or iodo,
$R_1$ is nitro, cyano, methylsulfonyl, sulfamoyl, $C_{1-2}$alkylsulfamoyl or di-($C_{1-2}$alkyl)sulfamoyl,
$R_2$ is hydrogen, chloro, bromo, iodo, nitro, cyano or methylsulfonyl,
$R_3$ is hydrogen, chloro, bromo, methyl, $C_{1-2}$alkoxy, $C_{1-2}$alkylsulfonylamino, ($C_{1-2}$alkoxy)carbonylamino, 2-($C_{1-4}$alkoxy)ethoxycarbonylamino, ($C_{1-2}$alkyl)carbonylamino or ($C_{1-2}$alkyl)carbonylamino the alkyl moiety of which is monosubstituted by chloro, bromo, hydroxy, $C_{1-4}$alkoxy, cyano, phenyl or phenoxy,
$R_4$ is hydrogen, $C_{1-2}$alkyl or $C_{1-2}$alkoxy,
$R_5$ is allyl; chloroallyl; bromoallyl; iodoallyl; cyclohexyl; $C_{1-4}$alkyl; $C_{2-4}$alkyl monosubstituted in the 2-, 3- or 4-position by hydroxy, $C_{1-2}$alkoxy, $C_{1-2}$(alkoxy)ethoxy, allyloxy, propynyloxy, ($C_{1-3}$alkyl)carbonyloxy, ($C_{1-3}$alkoxy)carbonyloxy or phenoxy; or $C_{1-4}$alkyl monosubstituted by halo, cyano, ($C_{1-2}$-alkoxy)carbonyl or phenyl, and
$R_6$ is hydrogen; allyl, chloroallyl; bromoallyl; iodoallyl; cyclohexyl; $C_{1-4}$alkyl; $C_{2-4}$alkyl monosubstituted in the 2-, 3- or 4-position by hydroxy, $C_{1-2}$alkoxy, $C_{1-2}$alkoxyethoxy, allyloxy, propynyloxy, ($C_{1-3}$alkyl)carbonyloxy, ($C_{1-3}$alkoxy)carbonyloxy or phenoxy; or $C_{1-4}$alkyl monosubstituted by halo, cyano, ($C_{1-2}$alkoxy)carbonyl or phenyl or

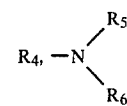

and the ring carbon atoms to which they are joined taken together are

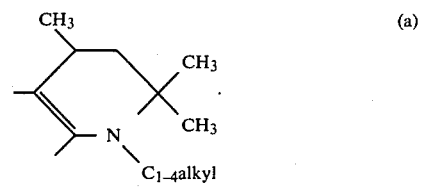

(a)

12. A process according to claim 11 wherein $R_1$ is nitro.

13. A process according to claim 11 wherein $R_2$ is hydrogen, chloro, bromo, nitro, cyano or methylsulfonyl.

14. A process according to claim 11 wherein $R_3$ is ($C_{1-2}$alkyl)carbonylamino, ($C_{1-2}$alkoxy)carbonylamino or $C_{1-2}$alkylsulfonylamino.

15. A process according to claim 11 wherein $R_4$ is hydrogen or $C_{1-2}$alkoxy.

16. A process according to claim 11 wherein $R_5$ is $C_{2-4}$alkyl, cyclohexyl or $C_{2-3}$alkyl monosubstituted in the 2- or 3-position by ($C_{1-2}$alkyl)carbonyloxy, cyano, hydroxy or phenyl.

17. A process according to claim 16 wherein $R_6$ is hydrogen, $C_{2-4}$alkyl, cyclohexyl or $C_{2-3}$alkyl monosubstituted in the 2- or 3-position by ($C_{1-2}$alkyl)carbonyloxy, cyano, hydroxy or phenyl.

18. A process according to claim 11 wherein the copper thiocyanate or copper thiocyanate-forming mixture of salts is cuprous thiocyanate or a cuprous thiocyanate-forming mixture of salts, the reaction is carried out at a temperature of 0° C. to about 100° C. in a solvent selected from dimethylformamide, dimethyl sulfoxide, dimethyl sulfone, methylpyrrolidone, pyridine and a mixture of such a solvent and a small amount of water, and the oxidizing agent is oxygen or sodium perborate.

19. A process according to claim 18 wherein 2 to 3 moles of sodium perborate per mole of azobenzene compound are utilized as the oxidizing agent.

* * * * *